United States Patent
Takanashi

(10) Patent No.: US 12,145,340 B2
(45) Date of Patent: Nov. 19, 2024

(54) METHOD OF MANUFACTURING PNEUMATIC TIRE AND FORMING DEVICE FOR PNEUMATIC TIRE

(71) Applicant: The Yokohama Rubber Co., LTD., Tokyo (JP)

(72) Inventor: Yuta Takanashi, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 573 days.

(21) Appl. No.: 17/266,583

(22) PCT Filed: Jul. 2, 2019

(86) PCT No.: PCT/JP2019/026352
§ 371 (c)(1),
(2) Date: Feb. 6, 2021

(87) PCT Pub. No.: WO2020/031559
PCT Pub. Date: Feb. 13, 2020

(65) Prior Publication Data
US 2021/0291472 A1   Sep. 23, 2021

(30) Foreign Application Priority Data
Aug. 7, 2018   (JP) .................................. 2018-148309

(51) Int. Cl.
*B29D 30/30*   (2006.01)
*B29D 30/24*   (2006.01)
(Continued)

(52) U.S. Cl.
CPC ........... *B29D 30/30* (2013.01); *B29D 30/242* (2013.01); *B29D 30/10* (2013.01); *B29D 30/14* (2013.01);
(Continued)

(58) Field of Classification Search
CPC .......................... B29D 30/16; B29D 30/1635; B29D 30/3035; B29D 30/08; B29D 30/10;
(Continued)

(56) References Cited

U.S. PATENT DOCUMENTS 852,855 A * 5/1907 Sloper ................... A45B 19/06
156/407
4,795,523 A   1/1989 Laurent et al.
(Continued)

FOREIGN PATENT DOCUMENTS

JP   H01-110941   4/1989
JP   H06-155628   6/1994
(Continued)

OTHER PUBLICATIONS

Ogawa Yuichiro, JP 2001-096638 A, updated machine translation. (Year: 2001).*
(Continued)

*Primary Examiner* — Sedef E Paquette
(74) *Attorney, Agent, or Firm* — Thorpe North & Western

(57) ABSTRACT

In a method of manufacturing a pneumatic tire, a placement unit is moved relative to a forming drum in a drum circumferential direction to repeatedly perform a one-side step of delivering a reinforcing wire in a folded back state in a length from a central portion toward one side in the width direction of the forming drum and compression bonding the reinforcing wire to an innerliner of an outer surface of the forming drum, and after delivering the reinforcing wire in the length toward the one side in the width direction as described above, perform an other-side step of delivering the reinforcing wire in a folded back state in a length from the central portion toward an other side in the width direction of the forming drum and compression bonding the reinforcing wire to an outer surface of the innerliner.

12 Claims, 12 Drawing Sheets

(51) Int. Cl.
  *B29D 30/10* (2006.01)
  *B29D 30/14* (2006.01)
  *B29D 30/16* (2006.01)
(52) U.S. Cl.
  CPC .......... *B29D 30/16* (2013.01); *B29D 30/1635* (2013.01); *B29D 2030/1678* (2013.01); *B29D 30/244* (2013.01); *B29D 30/3035* (2013.01)
(58) Field of Classification Search
  CPC ............ B29D 30/1621; B29D 30/1628; B29D 30/242; B29D 30/244; B29D 30/30; B29D 30/3028; B29D 30/38; B29D 2030/1678; B60C 9/023
  USPC ........... 156/117, 124, 130, 130.7, 394.1, 397
  See application file for complete search history.

(56) References Cited

U.S. PATENT DOCUMENTS

| | | | |
|---|---|---|---|
| 4,801,344 A | 1/1989 | Laurent et al. | |
| 4,944,828 A * | 7/1990 | Mayet | B29D 30/34 156/397 |
| 5,453,140 A * | 9/1995 | Laurent | B29D 30/70 156/173 |
| 5,616,209 A | 4/1997 | Laurent et al. | |
| 5,861,073 A * | 1/1999 | Gazuit | B60C 9/023 156/126 |
| 8,312,908 B2 * | 11/2012 | Hinc | B65H 51/20 254/335 |
| 2002/0011297 A1 * | 1/2002 | Caretta | B60C 5/14 152/538 |
| 2002/0117251 A1 | 8/2002 | Mayet | |
| 2004/0060633 A1 | 4/2004 | Panning | |
| 2004/0108073 A1 * | 6/2004 | Mayet | B29D 30/1635 156/397 |
| 2004/0154727 A1 | 8/2004 | Weissert et al. | |
| 2005/0028919 A1 * | 2/2005 | Panning | B29D 30/1635 152/562 |
| 2006/0162848 A1 | 7/2006 | Weissert et al. | |
| 2007/0125471 A1 | 6/2007 | Weissert et al. | |
| 2007/0125480 A1 * | 6/2007 | Henthorne | B29D 30/1635 156/397 |
| 2009/0133797 A1 | 5/2009 | Scarpitti | |
| 2013/0014878 A1 | 1/2013 | Scarpitti | |
| 2014/0174638 A1 | 6/2014 | Wandeler et al. | |

FOREIGN PATENT DOCUMENTS

| | | | |
|---|---|---|---|
| JP | 2001-096638 | 4/2001 | |
| JP | 2001-096638 A * | 4/2001 | ..... B29D 2030/1678 |
| JP | 2004-243770 | 9/2004 | |
| JP | 2004-535323 | 11/2004 | |
| JP | 2007-152953 | 6/2007 | |
| WO | WO 02/083434 | 10/2002 | |

OTHER PUBLICATIONS

International Search Report for International Application No. PCT/JP2019/026352 dated Sep. 17, 2019, 4 pages, Japan.

* cited by examiner

METHOD OF MANUFACTURING PNEUMATIC TIRE AND FORMING DEVICE FOR PNEUMATIC TIRE

TECHNICAL FIELD

The present technology relates to a method of manufacturing a pneumatic tire and a forming device for a pneumatic tire and particularly relates to a method of manufacturing a pneumatic tire and a forming device for a pneumatic tire in which when forming a green tire by layering tire components on an outer surface of the forming drum, a reinforcing wire extending in a width direction of a forming drum can be continuously disposed accurately and efficiently at a predetermined position in a circumferential direction of the forming drum.

BACKGROUND ART

When manufacturing a pneumatic tire, a known method includes forming a green tire by sequentially layering tire components on an outer surface of a core mold (rigid core) having an outer surface shape corresponding to a tire inner surface shape of a finished tire. In the forming method, a known forming step includes continuously disposing one reinforcing cord on the outer surface of a rubber member disposed on the outer surface of the core mold in the circumferential direction of a core mold while extending the reinforcing cord in a width direction of the core mold (see Japan Unexamined Patent Publication No. H06-155628).

The known forming step in Japan Unexamined Patent Publication No. H06-155628 includes reciprocating an eyelet through which the one reinforcing cord is inserted from the vicinity of one bead ring to the vicinity of an other bead ring, while the core mold is rotationally driven. That is, the reinforcing cord is delivered at a length corresponding to a length along the outer surface of the core mold between the bead rings disposed on both sides of the core mold in the width direction, and the delivered length is considerably long. As a result, misalignment of the reinforcing cord can easily occur, which is disadvantageous for accurate placement at a predetermined position. In addition, since it is necessary to reciprocate the eyelet a long distance in a complex path, a considerable amount of time is required to dispose the reinforcing cord at the predetermined position, and it is difficult to improve work efficiency.

SUMMARY

The present technology provides a method of manufacturing a pneumatic tire and a forming device for a pneumatic tire, in which when forming a green tire by layering tire components on an outer surface of the forming drum, a reinforcing wire extending in a width direction of a forming drum can be continuously disposed accurately and efficiently at a predetermined position in a circumferential direction of the forming drum.

A method of manufacturing a pneumatic tire according to the present technology includes the steps of forming a green tire by sequentially layering tire components including a reinforcing wire on an outer surface of a forming drum while continuously disposing the reinforcing wire extended in a drum width direction on an outer surface of a rubber member disposed on the outer surface of the forming drum in a drum circumferential direction, and vulcanizing the green tire, the forming including a one-side step of extending the reinforcing wire in the drum width direction by delivering the reinforcing wire in a folded back state in a predetermined length that is set in advance from a central portion in a width direction of the forming drum toward a one-side in the width direction of the forming drum and compression bonding the reinforcing wire to the outer surface of the rubber member, and including an other-side step of extending the reinforcing wire in the drum width direction by delivering the reinforcing wire in a folded back state in a predetermined length that is set in advance from the central portion in the width direction of the forming drum toward an other-side in the width direction of the forming drum after delivering the reinforcing wire in the folded back state in the predetermined length that is set in advance toward the one-side in the width direction in the one-side step, and compression bonding the reinforcing wire to the outer surface of the rubber member, the reinforcing wire extended in the drum width direction being continuously disposed in the drum circumferential direction by repeatedly performing the one-side step and the other-side step at positions shifted in the drum circumferential direction.

A forming device for a pneumatic tire according to the present technology includes a forming drum, an outer surface of the forming drum being sequentially layered with tire components including a reinforcing wire, a wire storage tool configured to stock the reinforcing wire, a placement unit configured to deliver the reinforcing wire from the wire storage tool and press the reinforcing wire against the outer surface of the forming drum, a circumferential direction movement mechanism configured to relatively move the placement unit relative to the forming drum in a drum circumferential direction, the placement unit including a one-side movement mechanism configured to deliver the reinforcing wire in a folded back state in a predetermined length that is set in advance from a central portion in a width direction of the forming drum toward a one-side in the width direction of the forming drum, a one-side compression bonding portion configured to press the delivered reinforcing wire against the outer surface of the forming drum, an other-side movement mechanism configured to deliver the reinforcing wire in a folded back state in a predetermined length that is set in advance from the central portion in the width direction of the forming drum toward an other-side in the width direction of the forming drum after delivering the reinforcing wire in the folded back state in the predetermined length that is set in advance toward the one-side in the width direction, and an other-side compression bonding portion configured to press the delivered reinforcing wire against the outer surface of the forming drum.

According to the present technology, when forming a green tire by sequentially layering the tire components including the reinforcing wire on the outer surface of the forming drum, the one-side step is performed from the central portion in the width direction of the forming drum to the one-side in the width direction of the forming drum, and the other-side step is performed from the central portion in the width direction of the forming drum to the other-side in the width direction of the forming drum, so that a delivered length of the reinforcing wire when compression bonded to the outer surface of the rubber member can be set to be approximately half of that of the known technology. When the delivered length is short, variations in the delivered length and the delivered direction are small. Thus, it is advantageous for continuously disposing the reinforcing wire extending in the width direction of the forming drum accurately at a predetermined position in the circumferential direction of the forming drum.

Additionally, the reinforcing wire in a folded back state having a predetermined length can be compression bonded to the outer surface of the rubber member disposed on the outer surface of the forming drum. Thus, the work time required per unit length of the reinforcing wire can be shortened, as compared to a case where the reinforcing member is extended from the central portion in the width direction of the forming drum to the one-side or the other-side in the width direction of the forming drum and then extended back to the central portion to be set in the folded back state.

Furthermore, even when the one-side step is not completed, the other-side step can be started after the reinforcing wire is delivered in a predetermined length to the one-side in the width direction of the forming drum. As a result, it becomes more advantageous for shortening the work time required per unit length of the reinforcing wire, and it becomes possible to further improve work efficiency.

DETAILED DESCRIPTION

Figure 1:
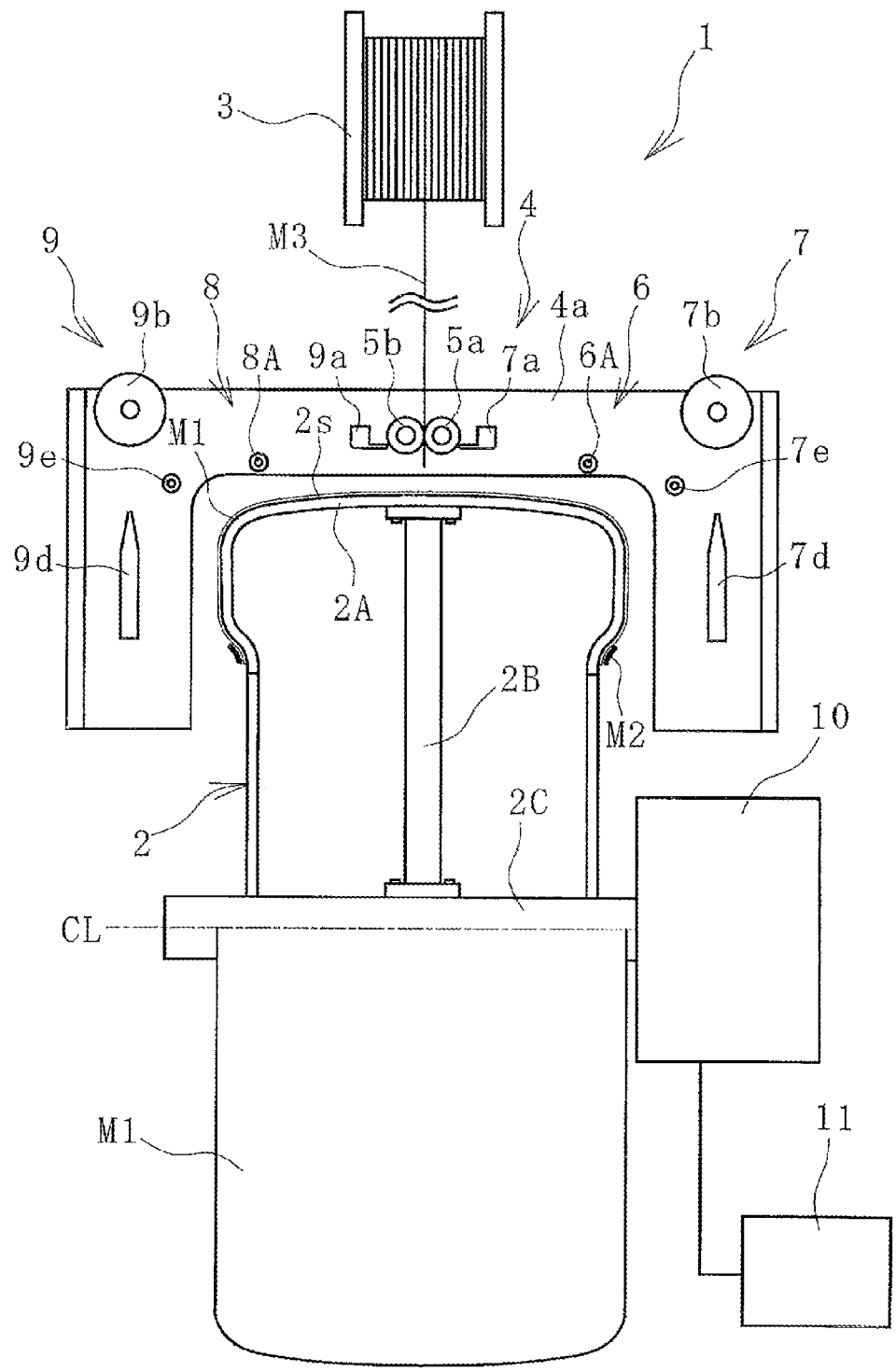
FIG. 1 is an explanatory diagram illustrating a forming device for a pneumatic tire of the present technology in a front view with the upper half of the forming drum in a cross-section.

The method of manufacturing a pneumatic tire and a forming device for a pneumatic tire according to embodiments of the present technology will be described below with reference to the drawings.

A forming device 1 for a pneumatic tire of the present technology illustrated in FIGS. 1 to 4 includes a forming drum 2, a wire storage tool 3 that stocks a reinforcing wire M3, a placement unit 4 that delivers the reinforcing wire M3 from the wire storage tool 3 and presses it against an outer surface 2s of the forming drum 2, and a circumferential direction movement mechanism 10 that relatively moves the placement unit 4 relative to the forming drum 2 in the drum circumferential direction. Operations of the forming drum 2, the placement unit 4, and the circumferential direction movement mechanism 10 are controlled by a control unit 11.

In a forming step using the forming device 1, a green tire G is formed. A pneumatic tire T is completed by vulcanizing the formed green tire G in a vulcanization step. Note that the width direction, the circumferential direction, and the radial direction of the forming drum 2 correspond respectively to the width direction, the circumferential direction, and the radial direction of the green tire G and the finished tire (pneumatic tire) T. A dot-dash line CL in FIGS. 1 and 14 indicate a center of a tire shaft.

Tire components (M1 to M5) are sequentially layered on the outer surface 2s of the forming drum 2. The reinforcing wire M3 is included in the tire components. Depending on tire specifications, necessary tire components are used as appropriate.

In this embodiment, a rigid core is used as the forming drum 2. A rigid core 2 is a cylindrical body having an outer surface corresponding to an inner surface of the finished tire T. The rigid core 2 is configured, for example, by mounting a plurality of metal segments 2A divided in the circumferential direction. In this embodiment, the rigid core 2 is configured by alternately combining, in the circumferential direction, segments 2A having relatively long circumferential lengths and segments 2A having relatively short circumferential lengths. The inner circumferential surface of each of the segments 2A and a center shaft 2C are decomposably connected by a support arm 2B. The relatively short segments 2A are sequentially moved inward in a radial direction and removed and then the relatively long segments 2A are sequentially moved inward in the radial direction and removed, so that the rigid core 2 is decomposed. In the present technology, not only the rigid core 2, but various forming drums 2 in which the tire components (M1 to M5) are sequentially layered when forming the green tire G can be used.

Various structures that can stock the reinforcing wire M3 can be used as the wire storage tool 3. In this embodiment, a reel having flange portions on both ends of the axial core is used as the wire storage tool 3, and the reinforcing wire M3 is wound around and stocked in the wire storage tool 3.

The placement unit 4 is provided with a one-side movement mechanism 6 and a one-side compression bonding portion 7 that handle the range from a central portion in the width direction of the forming drum 2 to the one-side in the width direction (hereinafter referred to as the right side in the present embodiment) of the forming drum 2, and an other-side movement mechanism 8 and an other-side compression bonding portion 9 that handle the range from the central portion in the width direction of the forming drum 2 to the other-side in the width direction (hereinafter referred to as the left side in this embodiment) of the forming drum 2. All or a portion of the one-side movement mechanism 6, the one-side compression bonding portion 7, the other-side movement mechanism 8, and the other-side compression bonding portion 9 are movably provided with respect to a base 4a, for example. In this embodiment, two bases 4a are placed opposite each other, and the placement unit 4 is fixed at a predetermined position by a frame or the like connected to each of the bases 4a.

The one-side movement mechanism 6 and the other-side movement mechanism 8 have a substantially identical structure, and only the placement and the like differs in correspondence to the handling ranges. The one-side compression bonding portion 7 and the other-side compression bonding portion 9 have a substantially identical structure, and only the placement and the like differs in correspondence to the handling range.

The placement unit 4 includes a pair of right and left center guide rollers 5a and 5b disposed outward of an outer circumference of the outer surface 2s of the forming drum 2 at the central portion in the width direction of the forming drum 2. The reinforcing wire M3 delivered from the wire storage tool 3 passes through between the center guide rollers 5a and 5b. A pair of right and left center plates 7a and 9a are disposed with the center guide rollers 5a and 5b interposed therebetween. Each of the center plates 7a and 9a are configured to move in the radial direction of the forming drum 2 and to be capable of being in proximity to and away from the outer surface 2s of the forming drum 2.

The one-side movement mechanism 6 delivers the reinforcing wire M3 in a folded back state in a predetermined length that is set in advance from the central portion in the width direction toward the right side of the forming drum 2. The one-side movement mechanism 6 in this embodiment includes a pull roller 6A that moves in the width direction (right and left direction) of the forming drum 2. The pull roller 6A includes two roller portions 6b of which axial core portions can be freely coupled and decoupled each other. The reinforcing wire M3 becomes the folded back state by being wound around and engaged with the pull roller 6A.

The one-side compression bonding portion 7 presses the reinforcing wire M3 delivered in a predetermined length by the one-side movement mechanism 6 against the outer surface 2s of the forming drum 2. The one-side compression bonding portion 7 includes a compression bonding roller 7b disposed on the right side of the forming drum 2 and a center plate 7a disposed on the right side of the center guide roller 5a on the right side. The compression bonding roller 7b is configured to be movable in the radial direction of the forming drum 2 on the right side of the forming drum 2 while rotating. An outer circumferential surface of the compression bonding roller 7b is provided with a fix projection 7c projecting from the outer circumferential surface. The fix projection 7c can be configured to move in the radial direction of the compression bonding roller 7b, so that the projecting amount from the outer circumferential surface can be changed.

The one-side compression bonding portion 7 of this embodiment includes a guide rod 7d that moves in proximity to and away from the fix projection 7c of the compression bonding roller 7b and a tension roller 7e that can traverse between the compression bonding roller 7b and the center plate 7a. The guide rod 7d is a rod-shaped body having a tapered shape leading edge portion and has a larger diameter than the fix projection 7c. When the guide rod 7d is brought into proximity to the fix projection 7c, the leading edge of the guide rod 7d engages with the fix projection 7c.

The other-side movement mechanism 8 delivers the reinforcing wire M3 in a folded back state in a predetermined length that is set in advance from the central portion in the width direction of the forming drum 2 toward the left side. The other-side movement mechanism 8 in this embodiment includes a pull roller 8A that moves in the width direction (right and left direction) of the forming drum 2. The pull roller 8A includes two roller portions 8b that can freely couple and decouple axial core portions with each other. The reinforcing wire M3 becomes the folded back state by being wound around and engaged with the pull roller 8A.

The other-side compression bonding portion 9 presses the reinforcing wire M3 delivered in a predetermined length by the other-side movement mechanism 8 against the outer surface 2s of the forming drum 2. The other-side compression bonding portion 9 includes a compression bonding roller 9b disposed on the left side of the forming drum 2 and a center plate 9a disposed on the left side of the center guide roller 5b on the left side. The compression bonding roller 9b is configured to be movable in the radial direction of the forming drum 2 on the left side of the forming drum 2 while rotating. An outer circumferential surface of the compression bonding roller 9b is provided with a fix projection 9c projecting from the outer circumferential surface. The fix projection 9c can be configured to move in the radial direction of the compression bonding roller 9b, so that the projecting amount from the outer circumferential surface can be changed.

The other-side compression bonding portion 9 of this embodiment includes a guide rod 9d that moves in proximity to and away from the fix projection 9c of the compression bonding roller 9b and a tension roller 9e that can traverse between the compression bonding roller 9b and the center plate 9a. The guide rod 9d is a rod-shaped body having a tapered shape leading edge portion and has a larger diameter than the fix projection 9c. When the guide rod 9d is brought into proximity to the fix projection 9c, the leading edge of the guide rod 9d engages with the fix projection 9c. In this embodiment, the compression bonding rollers 7b and 9b are attached to one base 4a, and components of the placement unit 4 other than the compression bonding rollers 7b and 9b are attached to the other base 4a.

A circumferential direction movement mechanism 10 relatively moves the placement unit 4 relative to the forming drum 2 in the circumferential direction of the forming drum 2. In this embodiment, a drive motor that rotatory drives the forming drum 2 is used as the circumferential direction movement mechanism 10. In other words, the placement unit 4 is configured to be in an immovable state in the circumferential direction of the forming drum 2, and the forming drum 2 is configured to be moved in the circumferential direction. In the present technology, it is also conceivable that the forming drum 2 is configured to be in an immovable state in the circumferential direction, and the placement unit 4 is configured to be moved in the circumferential direction of the forming drum 2. Alternatively, it is also conceivable that the placement unit 4 and the forming drum 2 both are configured to be moved in the circumferential direction of the forming drum 2 and relatively moved relative to each other in the circumferential direction.

Figure 2:
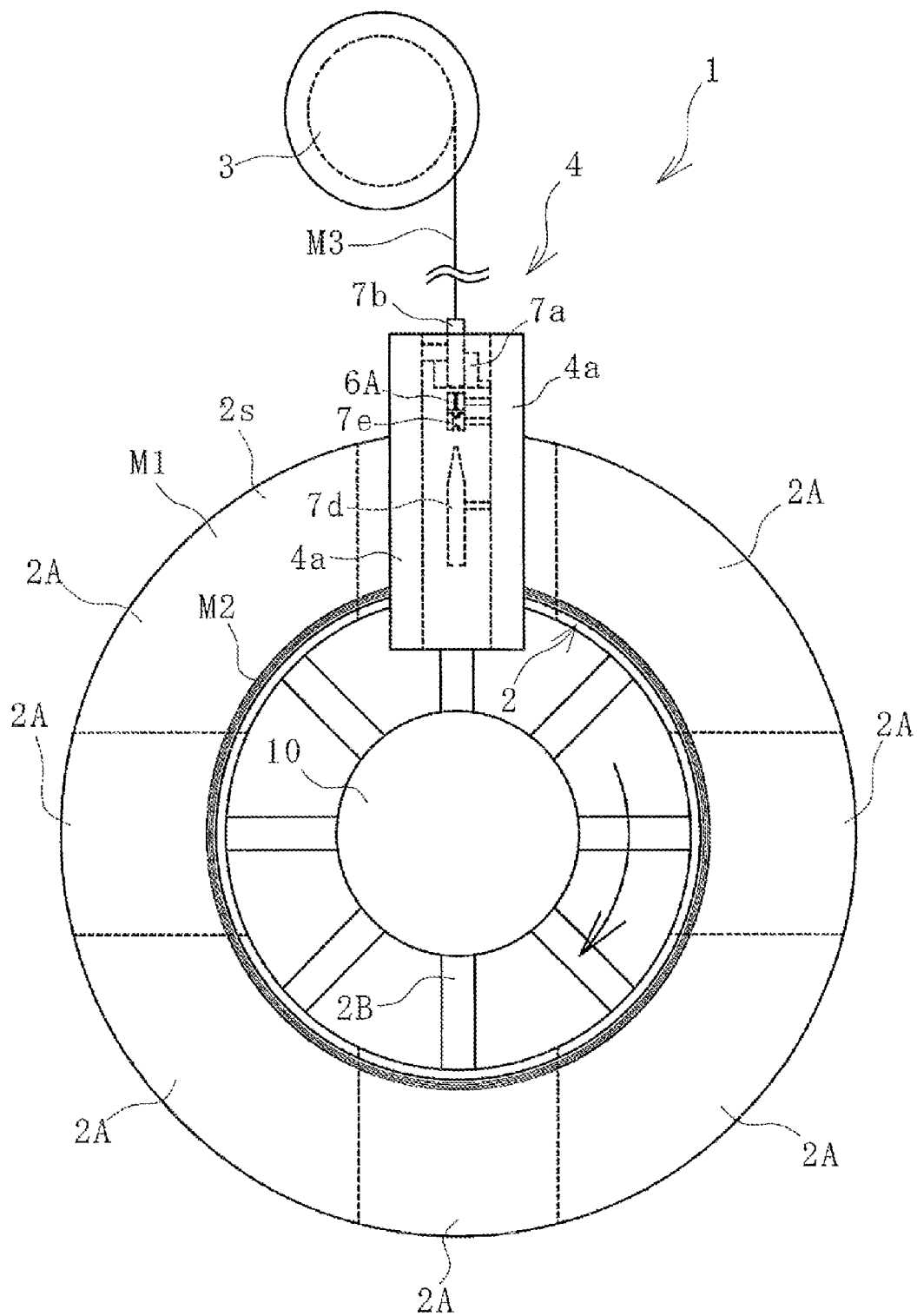
FIG. 2 is an explanatory diagram illustrating the forming device in FIG. 1 in a side view.
Figure 3:
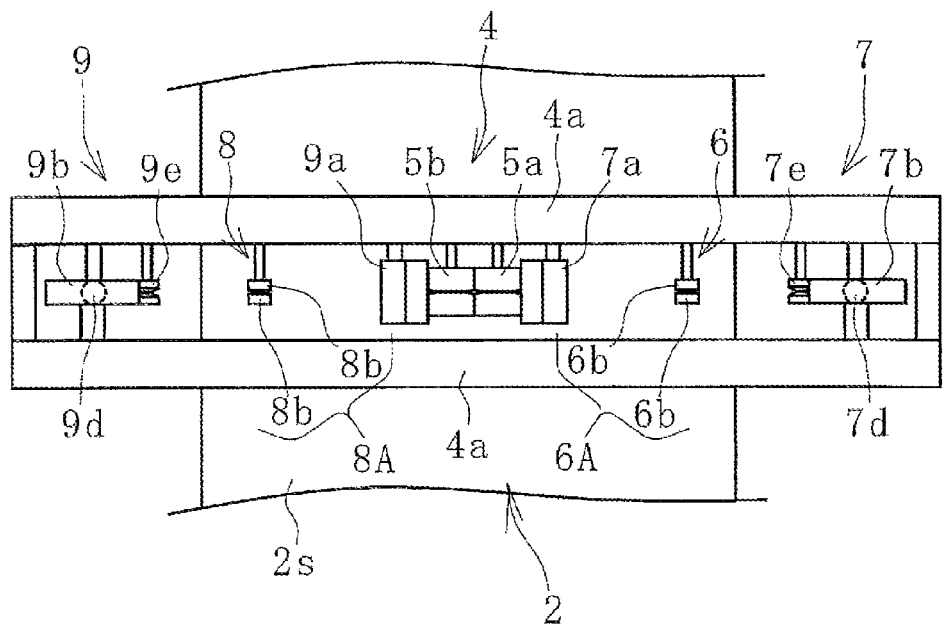
FIG. 3 is an explanatory diagram illustrating a placement unit and a forming drum in FIG. 1 in a plan view.

An example of the steps of the method of manufacturing a pneumatic tire according to an embodiment of the present technology will be described below. In the forming step using the forming device 1, the tire components (M1 to M5) are sequentially layered on the outer surface 2s of the forming drum 2. First, as illustrated in FIGS. 1 and 2, an innerliner M1 is wound around the outer surface 2s (outer surface 2s in substantially the entire range from the one-side surface to the other-side surface) of the forming drum 2 by an existing method. The bead wire M2 is compression bonded in an annular shape on the innermost circumferential portion of both side surfaces of an outer surface of the wound innerliner M1.

Figure 4:
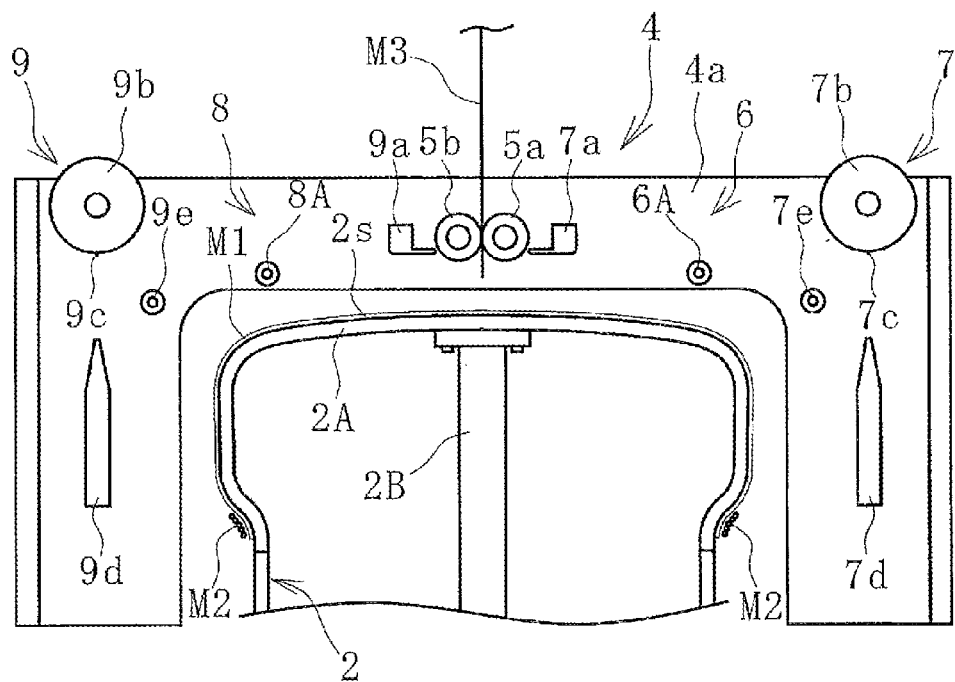
FIG. 4 is an explanatory diagram illustrating the placement unit and the forming drum in FIG. 1 in an enlarged manner.
Figure 5:
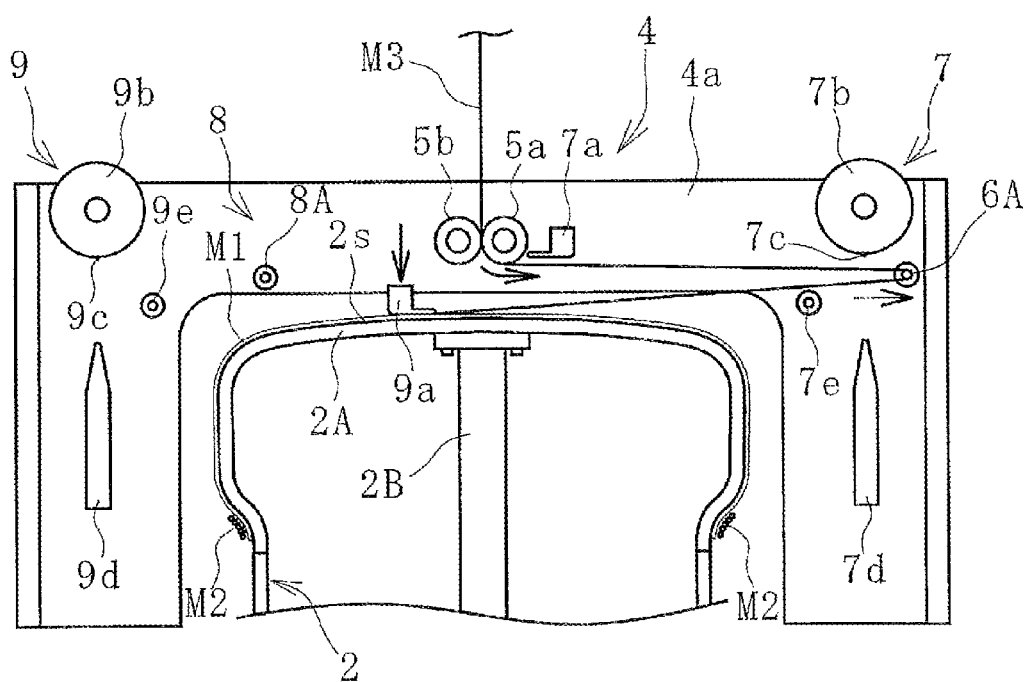
FIG. 5 is an explanatory diagram illustrating a state in which a reinforcing wire is delivered to a one-side in a width direction of the forming drum by a one-side movement mechanism in FIG. 4.

Next, a carcass cord that forms a carcass layer is layered, as the reinforcing wire M3, on the outer surfaces of these members M1 and M2. The placement unit 4 is used when layering the reinforcing wire M3. As illustrated in FIG. 4, the reinforcing wire M3 is delivered from the wire storage tool 3 and is passed through between the center guide rollers 5a and 5b. Next, as illustrated in FIG. 5, the reinforcing wire M3 is delivered to a certain length, and the leading edge portion thereof is pressed and compression bonded and fixed on the outer surface of the innerliner M1 by the center plate 9a on the left side that has been moved inward in the radial direction of the forming drum 2.

In a state where the leading edge portion of the reinforcing wire M3 is compression bonded and fixed on the outer surface of the innerliner M1, the reinforcing wire M3 is wound around and engaged with the pull roller 6A between the center plate 9a and the center guide roller 5a on the right side. By being engaged with the pull roller 6A, a folded back portion is formed in the reinforcing wire M3. In this state, the pull roller 6A is moved from the central portion in the width direction of the forming drum 2 toward the right side. Accordingly, the reinforcing wire M3 in a folded back state is delivered in a predetermined length that is set in advance. At this time, the guide rod 7d and the tension roller 7e are disposed in a predetermined standby position, and the delivered reinforcing wire M3 is in a state where the delivered reinforcing wire M3 is inserted between the compression bonding roller 7b and the tension roller 7e.

Figure 6:
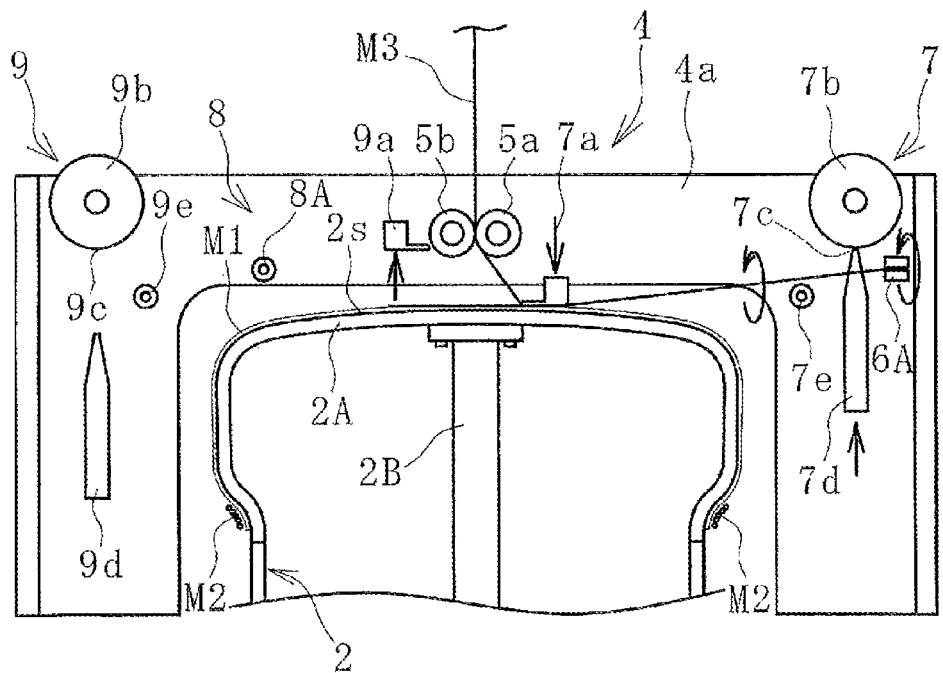
FIG. 6 is an explanatory diagram illustrating a state in which the delivered reinforcing wire in FIG. 5 is engaged with a guide rod.

Next, as illustrated in FIG. 6, by rotating the pull roller 6A in the circumferential direction of the forming drum 2, the delivered reinforcing wire M3 is twisted approximately 90° to change the orientation of the folded back portion. That is, the reinforcing wires M3 that are opposed to each other in the folded back portion are aligned in the radial direction of the forming drum 2 in FIG. 5, but are aligned in the circumferential direction of the forming drum 2 in FIG. 6. When changing the orientation of the folded back portion of the reinforcing wire M3, the placement unit 4 is relatively moved in the circumferential direction of the forming drum 2 by a predetermined rotation angle. Next, the center plate 7a on the right side is moved inward in a radial direction of the forming drum and the reinforcing wire M3 is pressed and compression bonded and fixed on the outer surface of the innerliner M1. The center plate 9a on the left side is moved outward in a radial direction of the forming drum 2 and is away from the innerliner M1 and the reinforcing wire M3.

Next, the guide rod 7d is moved outward in a radial direction of the forming drum 2 and is passed through between portions of the reinforcing wire M3 that are opposed to each other in the folded back portion. As a result, the leading edge of the guide rod 7d is engaged with the fix projection 7c of the compression bonding roller 7b.

Figure 7:
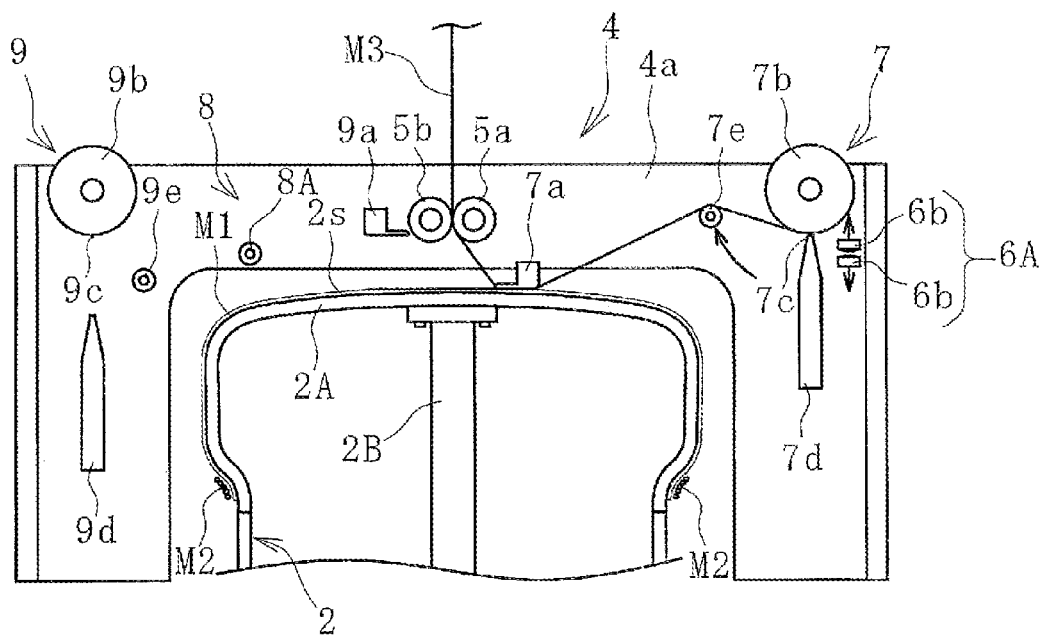
FIG. 7 is an explanatory diagram illustrating a state in which the delivered reinforcing wire in FIG. 6 is engaged with a fix projection of a compression bonding roller.

Next, as illustrated in FIG. 7, the coupling between the roller portions 6b of the pull roller 6A is released and divided. As a result, the state where the reinforcing wire is engaged with the pull roller 6A is canceled, and the reinforcing wire M3 engages with the guide rod 7d to maintain the folded back state.

Next, by moving the tension roller 7e outward in the radial direction of the forming drum 2, the reinforcing wire M3 traverses between the center plate 7a on the right side and the compression bonding rotor 7b, and thus the tension is applied to the reinforcing wire M3. By applying this tension, the folded back portion of the reinforcing wire M3 engages with the fix projection 7c.

Figure 8:
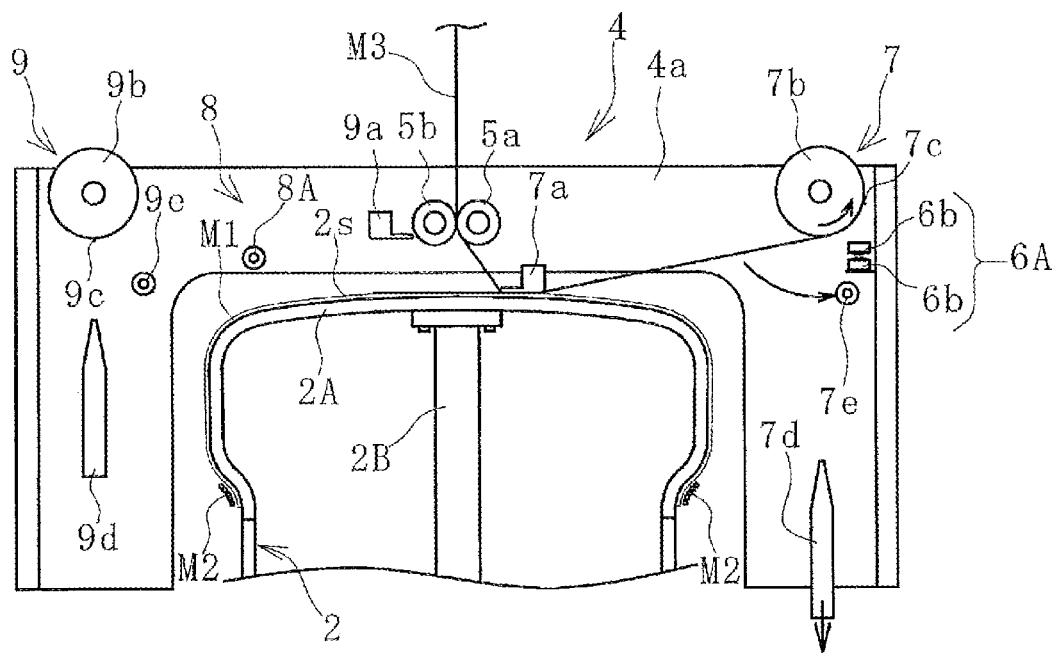
FIG. 8 is an explanatory diagram illustrating a state in which tension is applied to the delivered reinforcing wire in FIG. 7 by a compression bonding roller.

Next, as illustrated in FIG. 8, the compression bonding roller 7b is rotated, and the folded back portion of the reinforcing wire M3 is wound around the outer circumferential surface of the compression bonding roller 7b. At this time, the guide rod 7d and the tension roller 7e are returned to the predetermined standby position.

Figure 9:
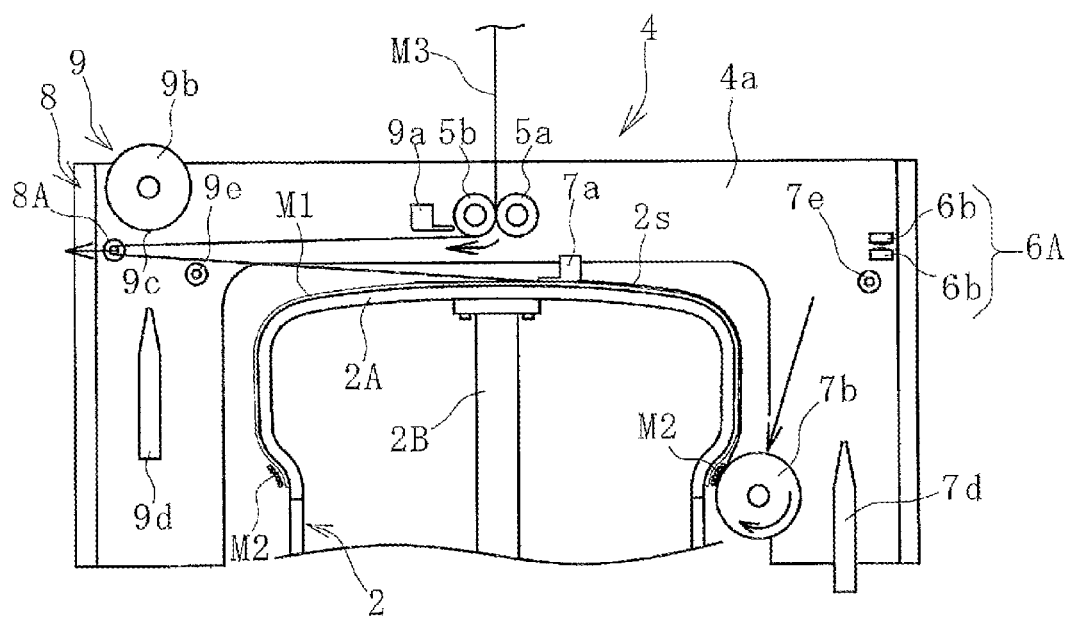
FIG. 9 is an explanatory diagram illustrating a state in which the delivered reinforcing wire in FIG. 8 is pressed against an outer surface of the forming drum by the compression bonding roller while the reinforcing wire is delivered to an other-side in the width direction of the forming drum by an other-side movement mechanism.

Next, as illustrated in FIG. 9, the compression bonding roller 7b is moved along the outer surface 2s on the right side of the forming drum 2 while being rotated, and the delivered reinforcing wire M3 is compression bonded and layered on the outer surfaces of the innerliner M1 and the bead wire M2. In this manner, one cycle of the one-side step of extending the reinforcing wire M3 in the folded back state from the central portion in the width direction toward the one-side in the width direction of the forming drum 2 is completed.

Note that a method in which the guide rod 7d and the tension roller 7e are omitted may be employed to engage the delivered reinforcing wire M3 with the fix projection 7c of the compression bonding roller 7b. For example, the fix projection 7c is protruded greatly from the outer circumferential surface of the compression bonding roller 7b in the state illustrated in FIG. 5. The fix projection 7c is passed through between the portions of reinforcing wire M3 that are opposed to each other in the folded back portion. Next, the coupling between the roller portions 6b of the pull roller 6A is released and divided. As a result, the state where the reinforcing wire is engaged with the pull roller 6A is canceled, and the reinforcing wire M3 engages with the fix projection 7c to maintain the folded back state. Then, as illustrated in FIG. 8, the compression bonding roller 7b is rotated, and the projecting amount of the fix projection 7c is reduced.

Next, the other-side step is started. In the one-side step, the reinforcing wire M3 is extended to the right side of the forming drum 2, and the other-side step only differs due to the fact that the reinforcing wire M3 is extended to the left side, while the rest performs substantially the identical operations. That is, in the other-side step, the reinforcing wire M3 in the folded back state is delivered in a predetermined length that is set in advance from the central portion in the width direction toward the left side of the forming drum 2. Then, the delivered reinforcing wire M3 is extended in the drum width direction by being compression bonded on the outer surface of the innerliner M1.

The other-side step may be started after the one cycle of the one-side step is completed, but can be started at the time when the reinforcing wire M3 is compression bonded and fixed on the outer surface of the innerliner M1 and delivered in a predetermined length by the center plate 7a on the right side in the one-side step. That is, the other-side step can be started before the one cycle of the one-side step is completed.

One cycle of the above-described one-side step and the other-side step is repeated at positions shifted at a predetermined rotation angle in the drum circumferential direction. In other words, the placement unit 4 is relatively moved relative to the forming drum 2 in the drum circumferential direction, and the one cycle of the one-side step and the other-side step is repeated. Note that in this embodiment, the one-side step is first performed, but the other-side step can be performed first.

When the relative movement length in the drum circumferential direction of the forming drum 2 is increased, the placement pitch in the circumferential direction of the reinforcing wire M3 is increased, and when the relative movement length is decreased, the placement pitch in the circumferential direction of the reinforcing wire M3 is decreased. Thus, the appropriate amount of relative movement of the placement unit 4 in the drum circumferential direction is set in accordance with the size of the placement pitch in the circumferential direction of the reinforcing wire M3.

Figure 10:
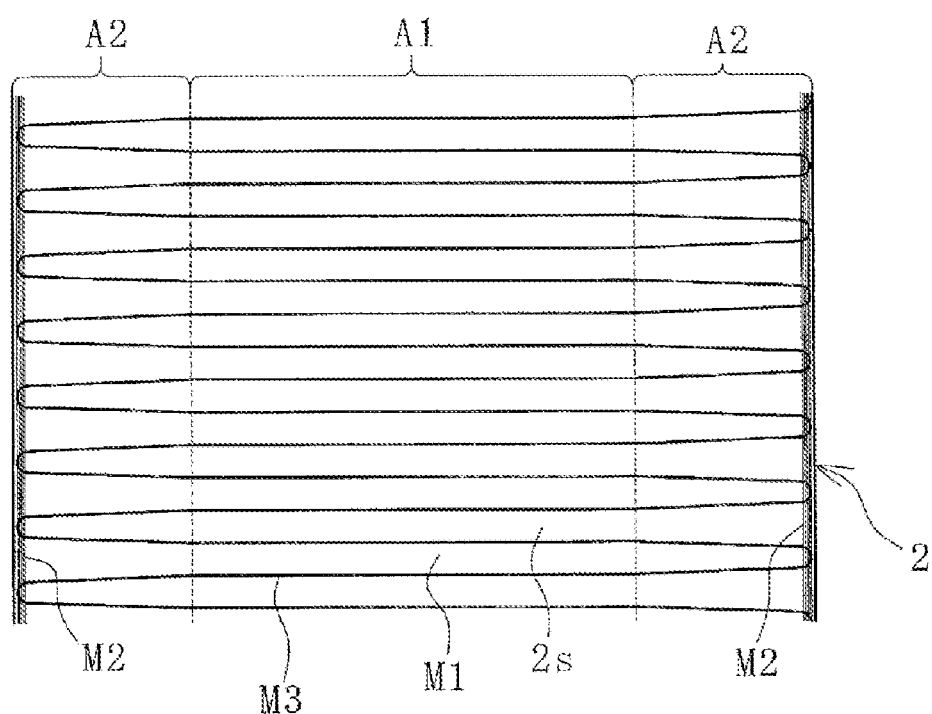
FIG. 10 is an explanatory diagram illustrating the reinforcing wire disposed in a forming step with the forming drum developed in front.
Figure 11:
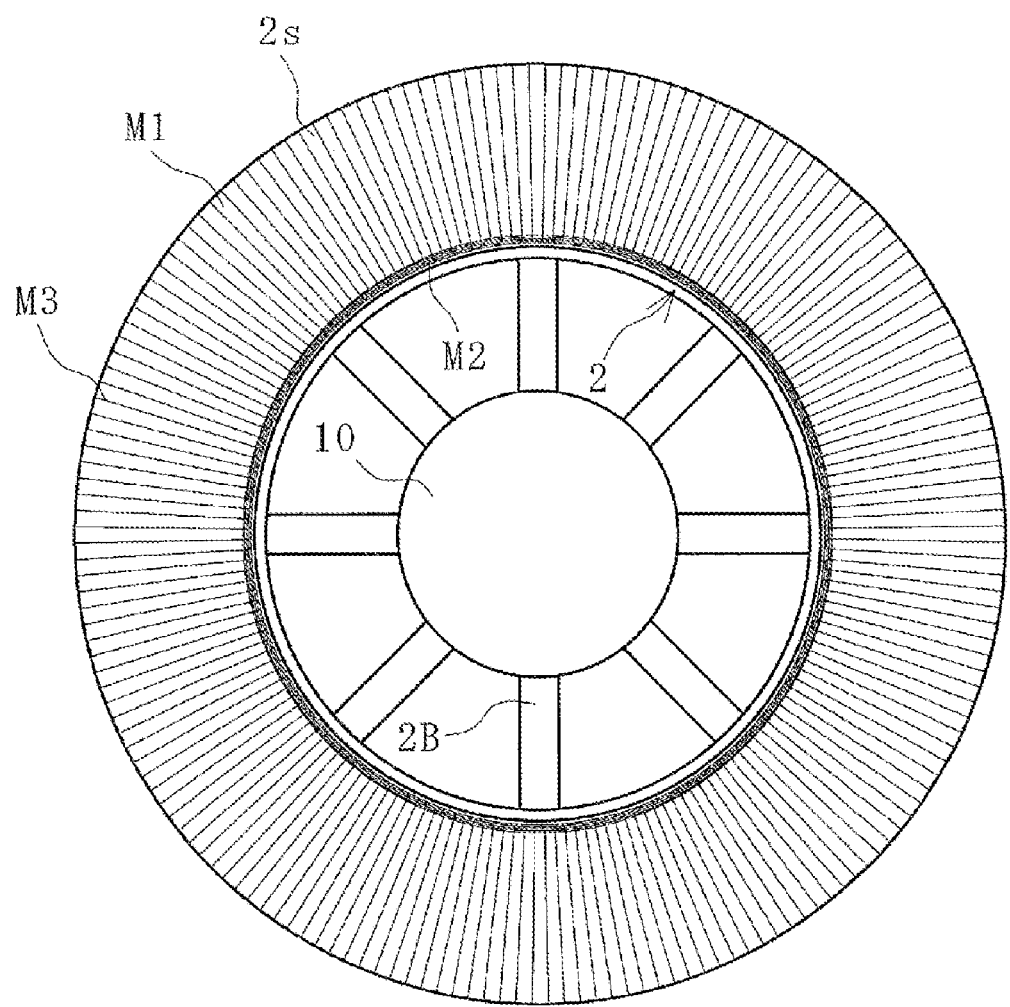
FIG. 11 is an explanatory diagram illustrating the reinforcing wire disposed in the forming step in a side view of the forming drum.

As illustrated in FIGS. 10 and 11, by repeating the above-described one-side step and the other-side step, a single reinforcing wire M3 extended on an outer circumferential surface A1 (a range corresponding to a tire tread) and both side surfaces A2 (ranges corresponding to tire sides) of the forming drum 2 in the width direction of the forming drum 2 can be continuously disposed in the drum circumferential direction.

Figure 12:
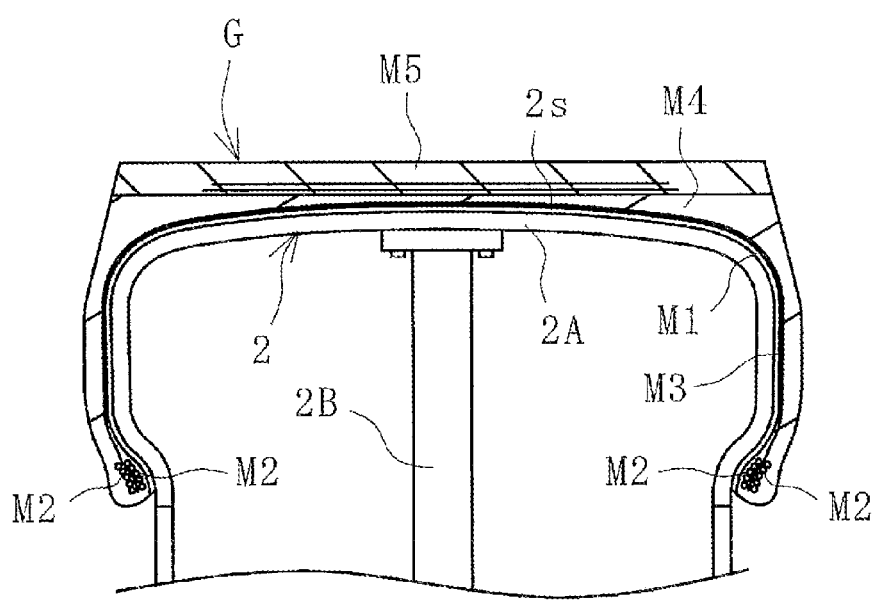
FIG. 12 is an explanatory diagram illustrating a portion of a green tire formed on an outer surface of the forming drum in a cross-sectional view.

Next, as illustrated in FIG. 12, by newly compression bonding and layering a bead wire M2 on the outer surface of the reinforcing wire M3 that has been layered on the outer surface of the bead wire M2, the reinforcing wire M3 is in a state where the reinforcing wire M3 is sandwiched between the bead wires M2 at each of both end portions in the width direction of the outer surface 2s of the forming drum 2. Next, a rubber member M4 is layered on the outer surface of the newly layered bead wire M2 and the reinforcing wire M3, and furthermore the outer surface of the rubber member M4 is layered with a rubber member M5 including a reinforcing layer, and thus the green tire G illustrated in FIG. 12 is completed.

Figure 13:
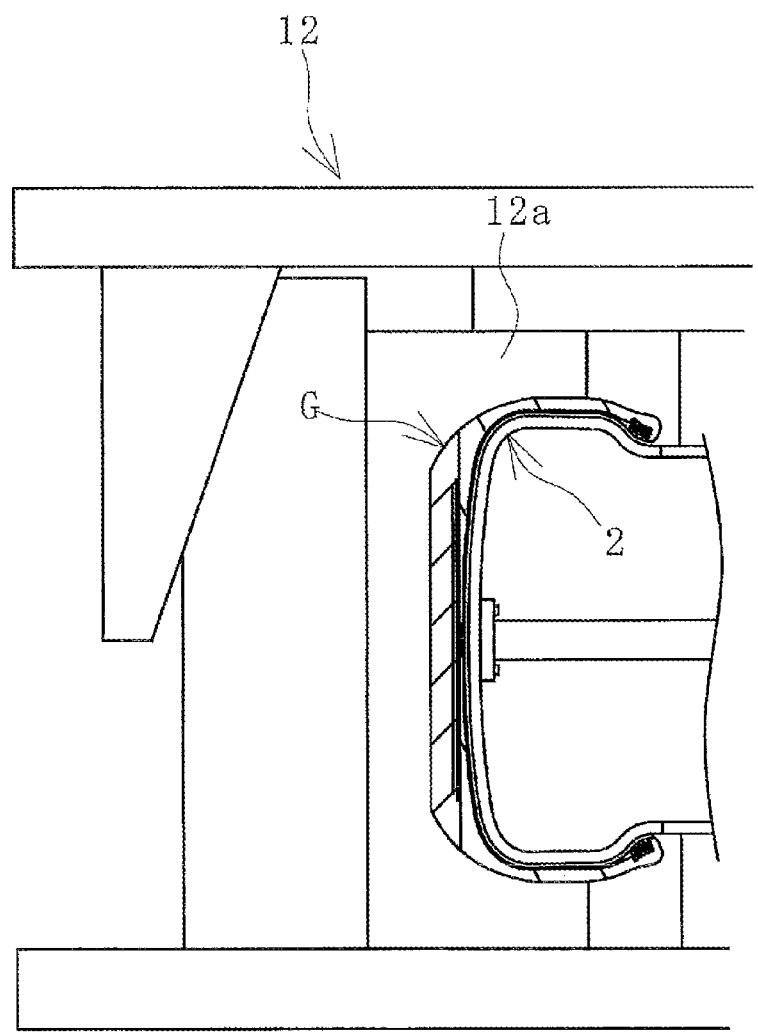
FIG. 13 is an explanatory diagram illustrating a portion of the green tire that is vulcanized by a vulcanization device in a cross-sectional view.
Figure 14:
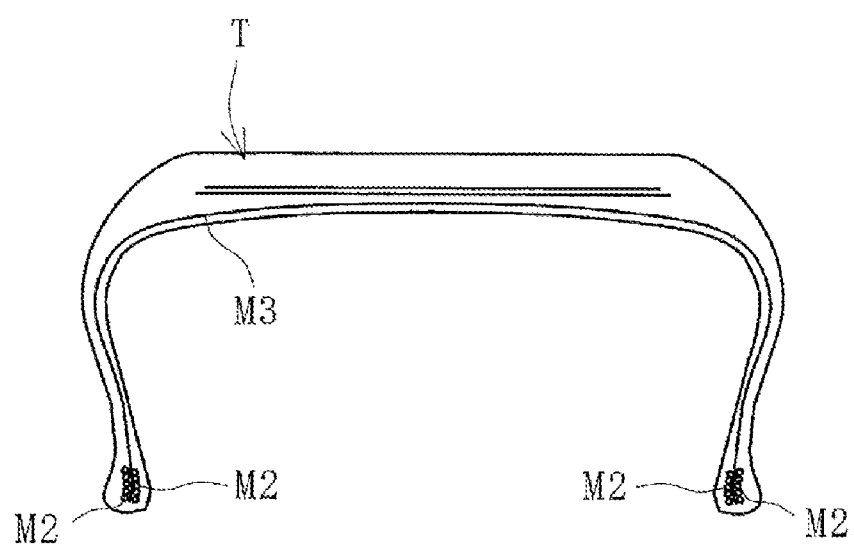
FIG. 14 is an explanatory diagram illustrating a portion of the manufactured pneumatic tire in a cross-sectional view.

As illustrated in FIG. 13, the formed green tire G is installed along with the rigid core 2 in a vulcanization mold 12a mounted in a vulcanization device 12, and is heated at a predetermined temperature while being pressurized at a predetermined pressure. By undergoing the vulcanization step for vulcanizing the green tire G in a predetermined period of time in this way, the pneumatic tire T illustrated in FIG. 14 is completed. After the vulcanization step, the rigid core 2 is decomposed and removed from the pneumatic tire T.

According to the present technology, when forming a green tire G by sequentially layering the tire components M1 to M5 on the outer surface 2s of the forming drum 2, the one-side step is performed from the central portion in the width direction of the forming drum 2 to the one-side in the width direction of the forming drum 2, and the other-side step is performed from the central portion in the width direction of the forming drum 2 to the other-side in the width direction of the forming drum 2, so that a delivered length of the reinforcing wire M3 when compression bonded to the outer surface of the innerliner M1 can be set to be approximately half of that of the known technology. At this time, if the delivered length of the reinforcing wire M3 is short, variations in the delivered length and the delivered direction will be small. as a result, the reinforcing wire M3 extending in the width direction of the forming drum 2 can be continuously disposed accurately at a predetermined position in the circumferential direction of the forming drum 2.

Additionally, the reinforcing wire M3 in a folded back state having a predetermined length can be compression bonded on the outer surface of the innerliner M1 disposed on the outer surface 2s of the forming drum 2. Thus, the work time required per unit length of the reinforcing wire M3 can be shortened, as compared to a case where the reinforcing wire M3 is extended from the central portion in the width direction of the forming drum 2 to the one-side or the other-side in the width direction of the forming drum 2 and then extended back to the central portion to be set in the folded back state. As a result, work efficiency is improved.

Furthermore, the other-side step can be started even when the one-side step is not completed. As a result, it becomes more advantageous for shortening the work time required per unit length of the reinforcing wire M3, and work efficiency is further improved.

The reinforcing wire M3 disposed according to the present technology is not limited to the carcass cord. For example, the present technology can also be applied when a reinforcing wire M3 that forms the breaker layer is disposed.

Figure 15:
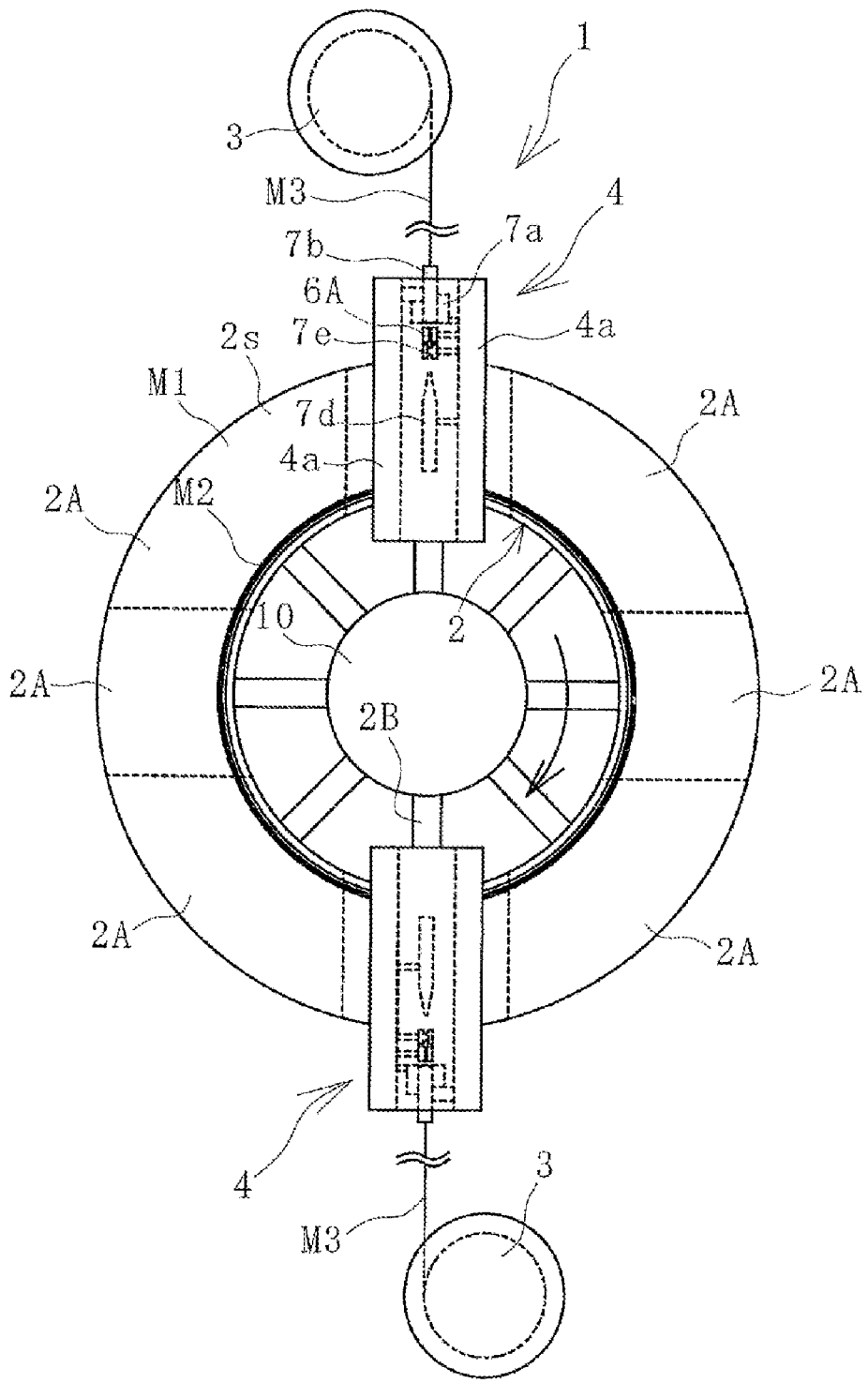
FIG. 15 is an explanatory diagram illustrating another embodiment of the forming device in a side view.

The number of placement units 4 installed on one forming drum 2 is not limited to one, and can be a plurality of units. For example, as illustrated in FIG. 15, a plurality of placement units 4 (not limited to two, and can be three or more) are installed at intervals in the circumferential direction of the forming drum 2. Each of the placement units 4 is simultaneously operated, and the forming steps are performed simultaneously in a plurality of ranges having different positions in the drum circumferential direction. As a result, the plurality of reinforcing wires M3 can be continuously disposed in the circumferential direction while simultaneously extended toward the width direction of the forming drum 2. In this embodiment, the carcass layer is formed by two reinforcing wires M3. As a result, the time required for forming the green tire G can be shortened.

The invention claimed is:

1. A method of manufacturing a pneumatic tire, comprising the steps of:
    forming a green tire by sequentially layering tire components comprising a reinforcing wire on an outer surface of a forming drum while continuously disposing the reinforcing wire extended in a drum width direction on an outer surface of a rubber member disposed on the outer surface of the forming drum in a drum circumferential direction; and
    vulcanizing the green tire;
    the forming comprising:
    a one-side step of extending the reinforcing wire toward a one-side in the drum width direction, folding the reinforcing wire on the one-side in the drum width direction to a folded back state in a predetermined length, delivering the reinforcing wire in the folded back state in the predetermined length from a central portion in a width direction of the forming drum toward the one-side in the width direction of the forming drum, and compression bonding the reinforcing wire to the outer surface of the rubber member;
    an other-side step of extending the reinforcing wire toward an other-side in the drum width direction, folding the reinforcing wire on the other-side in the drum width direction to a folded back state in a predetermined length, delivering the reinforcing wire in the folded back state in the predetermined length from the central portion in the width direction of the forming drum toward the other-side in the width direction of the forming drum after delivering the reinforcing wire in the folded back state in the predetermined length that is folded to the predetermined length in advance toward the one-side in the width direction in the one-side step, and compression bonding the reinforcing wire to the outer surface of the rubber member; and the reinforcing wire extended in the drum width direction being continuously disposed in the drum circumferential direction by repeatedly performing the one-side step and the other-side step at positions shifted in the drum circumferential direction.

2. The method of manufacturing a pneumatic tire according to claim 1,
wherein a rigid core comprising an outer surface corresponding to an inner surface of a finished tire is used as the forming drum.

3. The method of manufacturing a pneumatic tire according to claim 2,
wherein the forming comprises a plurality of forming steps performed simultaneously in a plurality of ranges and using a plurality of reinforcing wires having different positions in the drum circumferential direction.

4. The method of manufacturing a pneumatic tire according to claim 3,
wherein the reinforcing wire is a carcass cord that forms a carcass layer.

5. The method of manufacturing a pneumatic tire according to claim 1,
wherein the forming comprises a plurality of forming steps performed simultaneously in a plurality of ranges and using a plurality of reinforcing wires having different positions in the drum circumferential direction.

6. The method of manufacturing a pneumatic tire according to claim 1,
wherein the reinforcing wire is a carcass cord that forms a carcass layer.

7. A forming device for a pneumatic tire, comprising:
a forming drum, an outer surface of the forming drum being sequentially layered with tire components comprising a reinforcing wire;
a wire storage tool configured to stock the reinforcing wire;
a placement unit configured to deliver the reinforcing wire from the wire storage tool and press the reinforcing wire against the outer surface of the forming drum; and
a circumferential direction movement mechanism configured to relatively move the placement unit relative to the forming drum in a drum circumferential direction;
the placement unit comprising
a one-side movement mechanism configured to extend the reinforcing wire toward a one-side in the width direction of the forming drum, fold the reinforcing wire on the one-side to a folded back state in a predetermined length, and subsequently deliver the reinforcing wire in the folded back state in the predetermined length from a central portion in a width direction of the forming drum toward the one-side in the width direction of the forming drum,
a one-side compression bonding portion configured to press the delivered reinforcing wire against the outer surface of the forming drum,
an other-side movement mechanism configured to extend the reinforcing wire toward an other-side in the width direction of the forming drum, fold the reinforcing wire on the other-side to a folded back state in a predetermined length, and subsequently deliver the reinforcing wire in the folded back state in the predetermined length from the central portion in the width direction of the forming drum toward the other-side in the width direction of the forming drum after delivering the reinforcing wire in the folded back state in the predetermined length that is folded to the predetermined length in advance toward the one-side in the width direction, and
an other-side compression bonding portion configured to press the delivered reinforcing wire against the outer surface of the forming drum.

8. The forming device for a pneumatic tire according to claim 7,
wherein the forming drum is a rigid core comprising an outer surface corresponding to an inner surface of a finished tire.

9. The forming device for a pneumatic tire according to claim 8,
wherein a plurality of the placement units are provided, each of the placement units being disposed at intervals in the circumferential direction of the forming drum, and each of the placement units being configured to simultaneously operate.

10. The forming device for a pneumatic tire according to claim 9,
wherein the reinforcing wire is a carcass cord.

11. The forming device for a pneumatic tire according to claim 7,
wherein a plurality of the placement units are provided, each of the placement units being disposed at intervals in the circumferential direction of the forming drum, and each of the placement units being configured to simultaneously operate.

12. The forming device for a pneumatic tire according to claim 7,
wherein the reinforcing wire is a carcass cord.

* * * * *